United States Patent [19]

Burkett

[11] Patent Number: 4,590,476
[45] Date of Patent: May 20, 1986

[54] TRACKING SERVO COMPENSATOR WITH RATE AIDING

[75] Inventor: Bill E. Burkett, Longwood, Fla.

[73] Assignee: The United States of America as represented by the Secretary of the Air Force, Washington, D.C.

[21] Appl. No.: 640,902

[22] Filed: Aug. 15, 1984

[51] Int. Cl.$^4$ .............................................. G01S 13/66
[52] U.S. Cl. ..................................... 343/7.4; 343/400; 343/422
[58] Field of Search ........................ 343/5 ST, 7.4, 7.3, 343/16 M, 757, 766, 758, 759, 762–765, 398, 400, 417, 422

[56] References Cited

U.S. PATENT DOCUMENTS

| | | | |
|---|---|---|---|
| 2,658,677 | 10/1953 | Lundstrom | 235/61.5 |
| 2,715,776 | 8/1955 | Knowles et al. | 343/7.4 |
| 2,999,235 | 9/1961 | Segebaden et al. | 343/7.4 |
| 3,443,476 | 5/1969 | Heider | 89/41 |
| 3,750,174 | 7/1973 | Belluck | 343/7.4 |
| 3,829,659 | 8/1974 | Margolis | 235/61.55 |
| 4,034,208 | 7/1977 | Vaeth | 235/61.55 |
| 4,084,159 | 4/1978 | Anderson et al. | 343/7.4 |
| 4,148,026 | 4/1979 | Gendreu | 343/5 ST |

Primary Examiner—Thomas H. Tarcza
Assistant Examiner—B. E. Gregory
Attorney, Agent, or Firm—Donald J. Singer; William C. Auton

[57] ABSTRACT

A tracking servo compensator is disclosed for radar systems which steer their antenna beams using a servomechanism that physically moves the antenna. The disclosed tracking servo compensator permits switching between trackers (e.g. from area to point track) and from one tracked target to another without undesirable transients that could cause loss of track. Rate aiding and target range estimates are provided when tracker base motion is known. The compensator works by providing a servo signal that continually monitors the error in estimated track point line-of-sight angular velocity independent of which tracker is employed or the target being tracked. When base motion is known, this signal is used to update the target range estimate so that an accurate rate aiding signal is available. The servo provides smooth controlled-speed transitions between track points during mode switching, and provides an input for manual slewing of the tracker platform during offset track conditions. It also provides an estimate of platform to track point range.

17 Claims, 12 Drawing Figures

TRACKING SERVO COMPENSATOR WITH RATE AIDING

STATEMENT OF GOVERNMENT INTEREST

The invention described herein may be manufactured and used by or for the Government for governmental purposes without the payment of any royalty thereon.

BACKGROUND OF THE INVENTION

The present invention relates generally to tracking radar systems and specifically to a tracking servo compensator that permits switching from over track to point track and from one tracked target to another without undesirable transients that could cause loss of track.

A tracking radar system measures the coordinates of a target and provides data which may be used to determine the target path and predict the future position. All or part of the available radar data range, elevation angle, original angle and doppler shaft may be used in predicting the future position of the target.

In conventional radar systems, the antenna beam is positioned by a servomechanism which mechanically steers the radar tracking beam by physically moving the antenna. A limitation on the tracking accuracy of the radar system is the hunting action of the servomechanism. The task to the servomechanism is sufficiently severe in maintaining track on a moving target while handling the backlash and compliance in the gears, shafts and structure of the mount which mechanically steers the radar tracking beam by physically moving the antenna.

The task of providing accurate tracking through the use of a servomechanism in radar tracking systems is alleviated, to some degree, by the following patents: U.S. Pat. No. 2,715,776 issued to Knowles et al on Aug. 22, 1955; U.S. Pat. N0. 4,034,208 issued to Vaeth et al on July 5, 1977; U.S. Pat. No. 3,443,476 issued to Heider et al on May 13, 1969; U.S. Pat. No. 3,829,659 issued to Margolis on Aug. 13, 1974; U.S. Pat. No. 2,658,677 issued to Lundstrom et al on Nov. 10, 1953; U.S. Pat. No. 4,148,026 issued to Gendreu on April 3, 1979.

Knowles et al is pertinent for its disclosure of a fire control and tracking apparatus for unstable craft such as aircraft or ships. The patent speaks of rate aided tracking and of aided tracking in which a predetermined displacement of the tracking control member produces both a corresponding proportional angular displacement of the line of sight and angular rate of change of the line of sight. The device of the patent also includes means for slewing the line of sight of the system. An angular acceleration aided electro-optical target tracking system is disclosed in Vaeth et al. Heider et al is directed to a gun control system having a movable platform and a movable gun sight mounted on the platform. A movable platform and sight uses integrated angular velocity signals to help track a target in the Margolis patent. Gandrew tracks a moving target from a moving platform and Lundstrom et al disclose a regenerative tracking apparatus.

The task of the servomechanism is compounded when the users of the radar system command the radar to switch targets or switch from area to point tracking. However, some of the prior art references disclose a method for providing smooth controlled-speed transitions between track points during mode switching.

In view of the foregoing discussion, it is apparent that there currently exists the need for an improved tracking servo compensator that permits switching from area to point track and from one tracked target to another with controlled speed to prevent undesirable transients that could cause loss of track. The present invention is directed towards satisfying that need.

SUMMARY OF THE INVENTION

This invention is directed to a tracking servo compensator that permits switching between trackers (e.g. from area to point track) and from one tracked target to another without undesirable transients that could cause loss of track. The tracking servo compensator continually monitors the error in the estimated track, line-of-sight angular velocity and generates a servo signal to the radar servomechanism which mechanically steers the radar tracking beam by physically moving the antenna.

One embodiment of the tracking servo compositor consists of: a selection switch, three summary junctions, one rate limiting element, an integrator and two amplifiers. The select switch is used to select either point track or area track, and conducts the tracker output signal $E_t$ into the tracking servo compensator. The signal $E_t$ is the tracking error, measured in radians.

From the select switch, the tracking error signal $E_t$ is amplified by the first amplifier and the amplified error signal is processed by the rate limiting element. This limiter prevents the track servomechanism from too rapidly moving from the old target to the new one when required by the user of the radar system.

The limiter output signal $w_L$ is conducted through a feedback loop through the integrator of value 1/S to the first summing junction where the integrated limiter output signal is combined with the original error signal $E_t$. The signal from the first summing junction is then amplified by the second amplifier to produce a filtered measure of error in the rate aiding signal $W_{TE}$.

The second summing junction combines $W_{TE}$ with the limiter output signal. The third summing junction combines the output of the second summing junction with a rate aiding signal $W_T$ to produce the servo signal $W_{pc}$.

The result is a servo signal provided by a tracking servo compensator that continually monitors the error in the track point line-of-sight angular velocity independent of which tracker is employed or which target is tracked.

The rate aiding signal and target range estimates are provided to the tracking servo compensator by elements of the host radar system, known in the art, when tracker base motion is known. When the base motion is known, this signal is used by the invention so that an accurate rate aiding signal is available.

It is an object of the invention to provide an improved tracking servo compensator to provide guidance to a servomechanism to mechanically steer an antenna beam without undesirable transients that could cause loss of track.

It is another object of the present invention to provide a means of switching from area track to point track in a radar system with controlled speed to minimize the potential of loss of track.

It is another object of the present invention to provide a means of switching targets in a radar system with controlled speed to minimize the potential of loss of track.

These together with other objects features and advantages on the invention will become more readily apparent from the following detailed description when taken in conjunction with the accompanying drawing wherein like elements are given like reference numerals throughout.

DETAILED DESCRIPTION OF THE PREFERRED EMBODIMENT

This invention is a tracking servo compensator which allows radar systems, which uses a servomechanism to steer an antenna beam, to switch between targets without undesirable transients that could cause loss of track.

Figure 1:
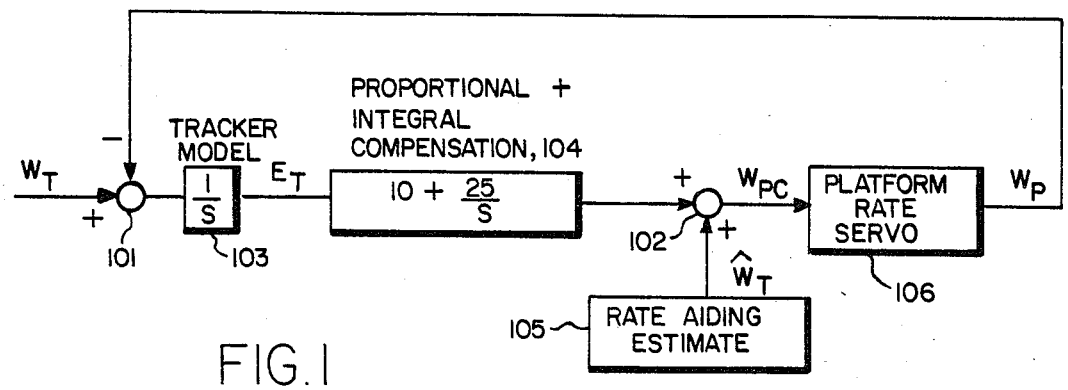
FIG. 1 is a block diagram of a single channel of the tracking servo compensator.

FIG. 1 is a block diagram of a single channel of the tracking servo which consists of two summing junctions 101 and 102, the tracker model 103, the proportional and integral compensation element 104, the rate aiding estimate 105, and the platform rate servo 106.

The first summing junction 101 subtracts the platform angular velocity $W_p$ from the target line-of-sight angular velocity $W_t$ to produce an output signal. The platform angular velocity $W_p$ is the output of the platform rate servo in radians/second which steers the antenna beam by physically moving the antenna. The target line-of-sight angular velocity $W_t$ is a signal in radians/second taken from the radar data from the host radar system.

The output signal from the first summing junction is processed by the tracker model 103, an integrator of value 1/S. The output signal of the tracker model 103 is the tracking error $E_T$ a signal measured in radians.

The tracking error is processed by the proportioned and integral compensation element 104, a circuit that provides a gain of 10 plus is an integrator of value 25/S.

There exists a variety of configurations by which the electrical equivalent of the proportional and integral compensation element could be produced. The simplest configuration would consist of an amplifier with a gain value of 10 in a parallel circuit with the series circuit of an integrator of value 1/S and a second amplifier with a gain of 25. Other electrical equivalents with additional features are discussed and presented in the subsequent figures depicting alternate embodiments of the present invention.

The second summing junction 102 combines the signal produced by the proportional and integral compensation element 104 with the signal $W_T$ from the rate aiding estimate 105. The signal $W_p$ is the estimated value of $W_T$ (the target line-of-sight angular velocity) and is measured in radians/second. The resultant signal produced by the second summing junction is the commanded platform angular velocity signal $W_{pc}$ which is measured in radians/second and is sent to the platform rate servo 106 to steer the antenna beam.

The servo of FIG. 1 can follow a constant $W_T$ with zero tracker hang-off error and can follow a ramping $W_T$ with a constant hang-off error even if no rate aiding signal can be supplied. This means that at long range when $W_T$ is small and not changing very fast that tracking error can be kept small even without a rate aiding signal. However, if tracker error is to be kept small at short range with $W_T$ large and rapidly changing, the large first and higher derivatives of $W_T$ can not be accurately followed by the unaided track loop, so a good estimate of $W_T$ must be provided by the rate aiding function.

Many and varied ways of computing the rate aiding signal have been tried. Most are based on the basic equation given below, where it is assumed that the velocity vector of the tracker base and the range vector from the tracker to the target are known.

$$\hat{W}_T = -\frac{\overline{R} \times \overline{V}}{\overline{R} \cdot \overline{R}}$$

where:
$\hat{W}_T$ = rate aiding signal, rad/sec.
$\overline{R}$ = range vector from tracker to target, ft.
$\overline{V}$ = translational velocity vector of tracker, ft/sec.

Often, the translational velocity vector is available from the navigated function, so the difficulty is to estimate the range vector from tracker to target.

Figure 2:
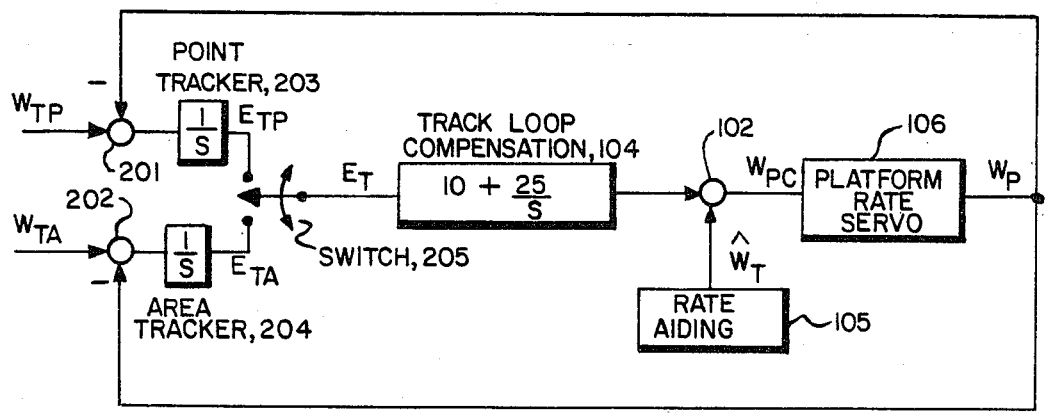
FIG. 2 is a block diagram of the tracking servo system of FIG. 1 for radars switching from area track to point track.

FIG. 2 is a block diagram of the tracking servo system of FIG. 1 supporting a radar system which switches from area track to point track. The elements of FIG. 2 are the same as those with like numerals of FIG. 1. However, the first summing junction 101 of FIG. 1 is replaced by two summing junctions 203 and 204 which subtract the platform angular velocity $W_p$ from the target line-of-sight angular velocities $W_{Tp}$ and $W_{TA}$ for area track and point track.

Additionally the single tracker model 103 is replaced by a model of the point tracker 203 and a model of the area tracker 204. Each tracker model is an integrator of value 1/S. The point tracker model 203 produces the point tracking error $E_{Tp}$ and the area tracker model 204 produces the area tracking error $E_{TA}$.

Finally, the sytem in FIG. 2 contains switch 205 conducting the tracking error $E_T$ from which every tracker is selected into the track loop compensation element 104, which is identical to the proportional and integral compensation element described for FIG. 1.

The task of estimating the range vector from tracker to target is difficult because there are so many factors interacting. For example, assume there is the radar system of FIG. 2 conducting an area track with a tracking error $E_T$ equal to zero. If the mode is switched from area track to point track, the radar will not necessarily be tracking the same target. Suddenly, there exists the potential for a large tracking error.

In the above example, assume further that the radar system is supported by perfect rate aiding such that $\hat{W}_T$, the estimated value of $W_T$ jumps immediately to the value of $W_{Tp}$, the target line-of-sight angular velocity for point tracking. The track loop 104 responds rapily to drive $E_T$ to zero, and thus pulls the point tracker right off its track point because the tracker itself can only tolerate relatively slow-motion of the track point in the field of view.

This catastrophe could apparently be prevented by placing a limiter in the path containing the track loop compensation. This would prevent the track servo from rapidly moving from the old target to the new one. This can not be done as straight forwardly as it might seem. The reason is that the integral part of the track loop compensation interferes. If the limiter is placed after this compensation network, the integrator charges up and causes a large overshoot of the new track point location. If the limiter is placed before the compensation, it integrates the limiter output causing the platform to move faster than desired and we're back to the danger of loss of track.

If the rate aiding signal were perfect, all this would cause no problem. In fact, for this case the integral compensation is not even necessary. Take the integrator out and the limiter works fine. In reality, the rate aiding signal is far from perfect. The integrator is required to keep the track error small even when the rate aiding signal is inaccurate. One reasonably successful approach is to retain the integrator, place the limiter after the compensation, and clamp the integrator when the limiter is in effect so that the integrator does not build up to an excessive signal.

Figure 3:
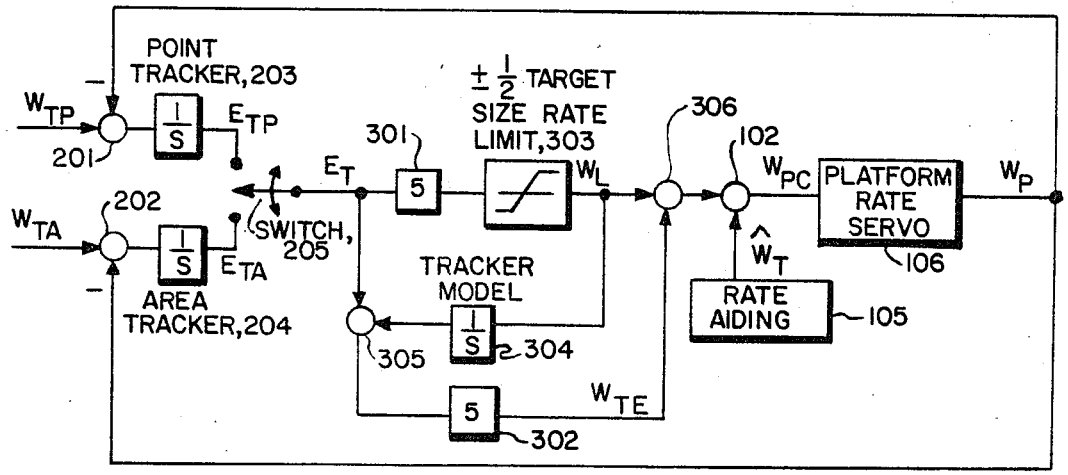
FIG. 3 is a block diagram of another embodiment of the invention which solves the mode switching problem.

FIG. 3 is a block diagram of an embodiment of the tracking servo compensator solving the mode switching problem discribed above. The elements of FIG. 3 are the same as those with like numerals of FIG. 2. However, the track loop compensation circuit 104 of FIG. 2 has the configuration of elements 301–306 in FIG. 3 to solve the mode switching problem.

First of all, ignoring the limiter 303, the transfer function of the track loop compensation has not changed, $(10+25/S)$. But the characteristics of this circuit to switches between trackers is unique, as will be shown. In the following discussion, the high bandwidth platform rate servo will be assumed to have a gain of unity $(w_p = w_{pc})$, and the tracker will be a perfect integrator with no delay. This simplifies the analysis, and only ignores affects that can be partially or perfectly compensated for in the real hardware case.

Under these assumptions, the following equations can be obtained from the above block diagram:

$$E_T = \int (W_T - W_p) \, dt \qquad 1$$

where $$W_T = \begin{cases} W_{TA}, \text{ for area track} \\ W_{Tp}, \text{ for point track} \end{cases}$$

and $$W_L = W_p - \hat{W}_T - W_E, \qquad 2$$

$$W_{TE} = 5(E_T + W_L dt) \qquad 3$$

Combining equations (1), (2), and (3):

$$W_{TE} = 5[\int (W_T - W_p) dt + \int (w_p - \hat{W}_T - W_{TE}) dt]$$

$$W_{TE} = 5 \int (W_T - \hat{W}_T - W_{TE}) dt \qquad 4$$

Converting the above integral equation to its differential form by differentiating both sides $$\dot{W}_{TE} = 5(W_T - \hat{W}_T) - 5W_{TE}$$

$$\dot{W}_{TE} + 5W_{TE} = 5(W_T - \hat{W}_T) \qquad 5$$

Switching to Laplace transform notation (and continuing to ignore initial conditions):

$$(S + 5) W_{TE} = 5 (W_T - \hat{W}_T) \qquad 6$$

$$W_{TE} = \frac{5}{S + 5} (W_T - \hat{W}_T)$$

It is apparent from this equation that $W_{TE}$ is a filtered measure of the error in the rate aiding signal. Now this is not unique to the configuration, since it is well known that the integrator in proportional and integral compensation will settle out to $(W_T - \hat{W}_T)$. What is unique is that if when we switch trackers, we initialize the tracker model integrator to its old value minus the change in tracker outputs, $W_{TE}$ will experience no immediate change. In fact, it will not change at all if $W_{TP} = W_{TA}$ even though $E_T$ (tracker output) sees a step change.

What actually happens after a mode switch is that the platform gradually moves from the area track target to the point track target at the rate permitted by the ½ target size rate limit and settles out with no overshoot. Simultaneously, the $W_{TE}$ signal smoothly (first order lag response as shown in equation (6) changes to the difference between the rate aiding signal and the point track target angular velocity. This provides a satisfactory way to switch from one track point to another at a controlled line-of-sight rate.

The key idea in understanding this performance is the realization that the signal $W_{TE}$ is completely unaffected by gain variations (or injected control signals) in the servo path between $E_T$ and $W_L$. This will be shown by block diagram reduction techniques in the set of equivalent diagrams of FIGS. 4A–4E.

FIGS. 4A through 4E are a series of equivalent diagrams that mathematically simplifies the track loop compensation circuit of FIG. 3, as applied to a single tracker.

Figure 4A:
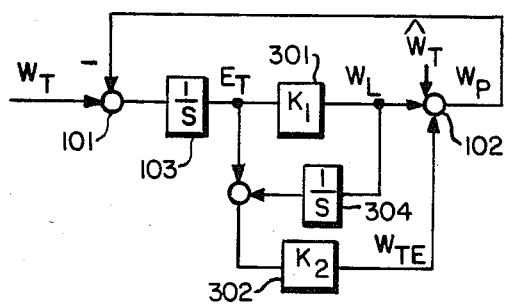
FIGS. 4A through 4E are a series of equivalent diagrams that mathematically simplify the track loop compensator circuit of FIG. 3.
Figure 4B:
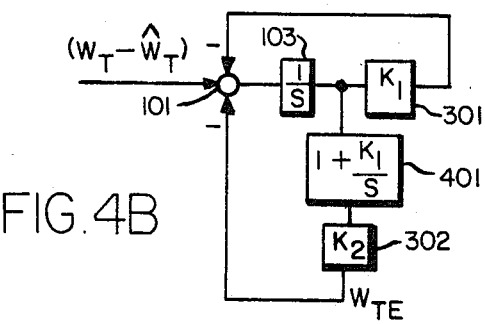

In FIG. 4B the parallel loop of amplifier 301 and integrator 304 and amplifier 302 of FIG. 4A are combined to produce two loops: one containing amplifier 301 and one containing amplifier 302 and the equivalent element 401.

Figure 4C:
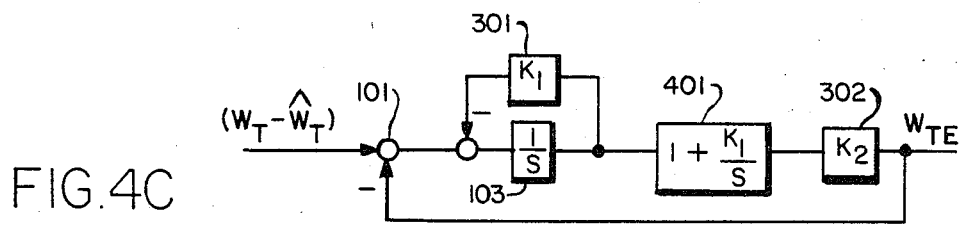

FIG. 4C is just an aesthetic rearrangement of FIG. 4B.

Figure 4D:
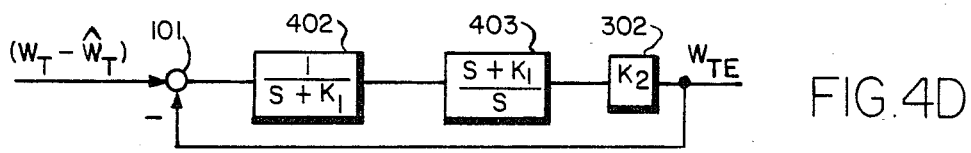

FIG. 4D combines integrator 103, which was in a parallel loop with amplifier 301 in FIG. 4C into the equivalent element 402.

Figure 4E:
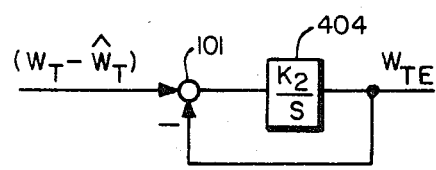

Finally FIG. 4E combines elements 402, 403 and 302, which were in series in FIG. 4D, into the single equivalent element 404.

Notice that the gain $K_1$ between $E_T$ and $W_L$ does not show up in the final equivalent diagram. The estimate $W_{TE}$ of the difference $(W_T - \hat{W}_T)$ depends only on $K_2$. Gain changes and signal transients in the $K_1$ path have no influence on $W_{TE}$ at all. This is the feature that was taken advantage of in eliminating the tracker switch induced transients. By reinitializing the tracker model integrator as described, the step change in tracker output was made to appear in the $K_1$ path. Thus the $W_{TE}$ signal merely continues its function of estimating $(W_T-\hat{W}_T)$ while the $K_1$ path with its limiter controls the rate at which the platform slews between targets. The basic equation $$\hat{W}_T = \frac{\overline{V} \times \overline{R}}{R \cdot R}$$

where $\overline{V}$ is the velocity (translational) of the platform, $\overline{R}$ is the range from the platform to the tracked point, and $W_T$ is the rate aiding signal, takes and especially simple expression if a coordinate frame is used whose "x axis" lies along the R vector. Then R, V, and $W_T$ take the form:

$$\overline{R} = \begin{bmatrix} R \\ 0 \\ 0 \end{bmatrix} \quad \overline{V} = \begin{bmatrix} V_x \\ V_y \\ V_z \end{bmatrix} \quad \overline{W} = \begin{bmatrix} W_x \\ W_y \\ W_z \end{bmatrix}$$

So:

$$\begin{bmatrix} W_x \\ W_y \\ W_z \end{bmatrix} = \frac{\begin{bmatrix} V_x \\ V_y \\ V_z \end{bmatrix} \times \begin{bmatrix} R \\ 0 \\ 0 \end{bmatrix}}{R^2} = \begin{bmatrix} 0 \\ V_z/R \\ -V_y/R \end{bmatrix}$$

Therefore:

$W_x = 0$, $W_y = V_z/R$, $W_z = -V_y/R$

Furthermore:

$\dot{R} = -V_x$.

Figure 5:
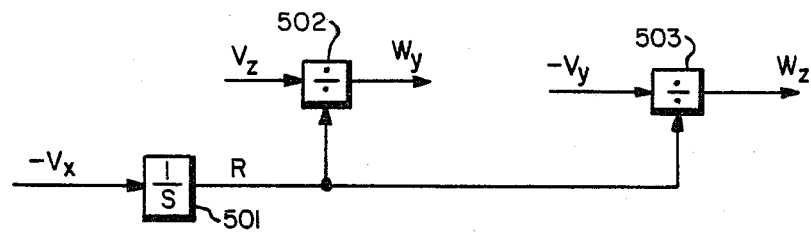
FIG. 5 is a block diagram of the rate aiding subsystem.

FIG. 5 is a block diagram of a subsystem which implements the solution to the rate aiding equations in the coordinate frame described above. Since $V_x$ is the velocity vector along the range vector from the platform, the integrator 501 integrates the relative velocity to yield the range R.

Next, from the radar data $V_z$ and $V_y$ are entered into their respective divider elements 502 and 503 to divide these velocity vectors by the range R received from integrator 501 to yield the respective values of $W_y$ and $W_z$.

Figure 6:
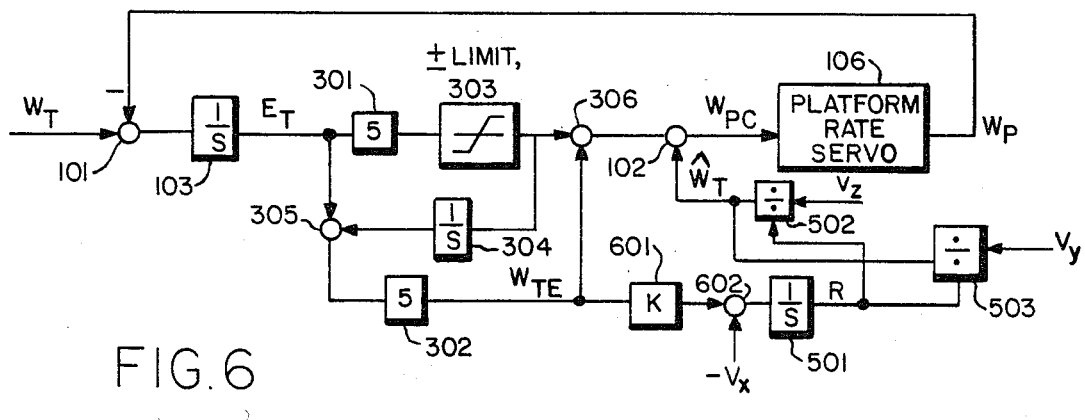
FIG. 6 is a block diagram of the tracking servo compensator of FIG. 3 using the rate aiding subsystem of FIG. 5.

FIG. 6 is a block diagram of the tracking servo compensator of FIG. 3 implementing the subsystem of FIG. 5 which solves the rate aiding equations. The elements of FIG. 6 correspond to like numerated elements in the previous figures.

The significance of FIG. 6 is that if a method can be found for updating the range estimate of the subsystem in FIG. 5, an accurate rate aiding signal can be obtained. This is done in FIG. 6 by using the $W_{TE}$ signal from the second amplifier 302 in the mode switch insensitive tracker loop. If the range estimate is wrong, $\hat{W}_T$, the estimated value of $W_T$, will not equal $W_T$ and $W_{TE}$ from amplifier 302 will register an estimate of the difference $(W_T - \hat{W}_T)$. This is used in FIG. 6 to update R through the properly selected gain of K in amplifier 601.

The value of the gain K in amplifier 601 is determined using the equation W = V/R. Therefore:

$$S_w = \frac{R\,SV - V\,SR}{R^2}$$

Assume V is changing slowly so $SV \equiv 0$.

$$S_w = \frac{-V}{R^2} SR = \frac{-W^2}{V} SR,$$

which implies $$SR = \frac{-V}{W^2} S_w$$

So to implement the relation $\hat{W}_T = 10\,W_{TE}$ (where 10 is arbitrary) choose $K = -10\,V_z/(W_T)^2$.

The path containing "K" can be thought of as a transfer circuit that adds the rate aiding error signal $W_{TE}$ into $\hat{W}_T$ until $\hat{W}_T = W_T$ (true target line of sight rate) and thus $W_{TE}$ has been driven to zero. The gain "K" controls the rate at which this transfer is performed. Now, it is desirable to have the transfer rate high, at least under conditions where the initial range estimate was poor and the target line of sight angular velocities are high. If "K" is made too large in the diagram shown on the previous page, $\hat{W}_T$ is updated faster than the $W_{TE}$ path can keep up with, thus causing overshoot and stability problems in the tracker loop. Originally, a lead network $$\frac{K_1(1 + T_1 S)}{(1 + T_2 S)}$$

with $T_1 > T_2$ was tried in the "K" path. This stabilized the path and permitted a reasonably large gain for "K".

As in FIG. 5, dividers 502 and 503 in FIG. 6 receive the target velocity vectors in cartesian coordinates $V_y$ and $V_z$ from the radar data received by the radar receiver. Both dividers divide their respective velocity vectors by the range value received from integrator 501 to yield output signals which combine to form an accurate rate aiding estimate $W_T$ which was taken from the radar data in real time.

Figure 7:
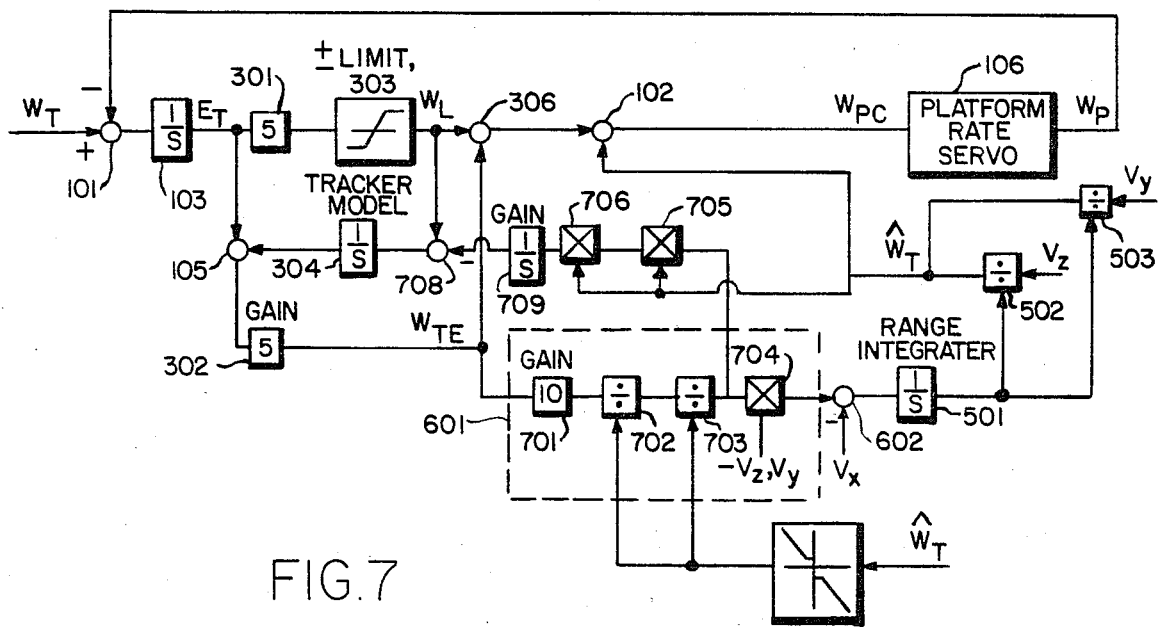
FIG. 7 is a block diagram of another embodiment of the invention.

FIG. 7 is a block diagram of an alternate embodiment of the present invention with another technique for stabilizing the operation of the transfer path. The elements of FIG. 7 correspond to like numerated elements in the previous figures. In fact, FIG. 7 is similar to the embodiment in FIG. 6 except the "K" gain, element 601 of FIG. 6, has been expanded to its full form (as shown in the sample calculation above) and a return path has been added back to the tracker model. To implement the correct gain K, amplifier 601 was replaced by elements 701–704. Element 701 is an amplifier of gain value equal to 10. Elements 702 and 703 are divider elements and 704 is a complex multiplier element.

In FIG. 7 the estimated value of $W_T$ is $\hat{W}_T$ which enters the minimum value circuit 700 which produces an output consisting of a non-zero $\hat{W}_T$. The purpose of the minimum value circuit is to prevent divider elements 702 and 703 from dividing by zero.

Divider element 702 divides the output of amplifier 701 by the non-zero $\dot{W}_T$ from the minimum value circuit 700. Divider element 703 divides the output of divider element 702 by the non-zero $\dot{W}_T$ from the minimum value circuit 700.

Multiplier 704 multiplies the output signal of divider 703 by the target velocity along the Z axis $V_z$. In FIG. 7, the output signal of multiplier 704 is combined with the target velocity vector along the range axis $V_x$ in summing junction 602.

FIG. 7 also has a return path back to the tracker model 304 consisting of two multipliers 705 and 706, an amplifier 707 of gain 1/5 and a summing junction 708. Multiplier 705 squares the output signal of divider 703 and multiplier 706 multiplies the output of multiplier 705 again by the output signal of divider 703. Amplifier 707 applies a gain of 1/5 to the output of multiplier 706 and the summing junction 708 subtracts the output of amplifier 707 from the output of the limiter 303 and sends the resultant to the tracker model 304.

The return path, described above, is the key to rapid and stable operation of the transfer loop. As soon as an increment is added to $\dot{W}_T$ by the "K" transfer path, an equal increment is deducted from $W_{TE}$ by the return path. Thus, the tracking loop never is aware that a transfer has taken place. This neatly eliminates the problem of high transfer rates.

Figure 8:
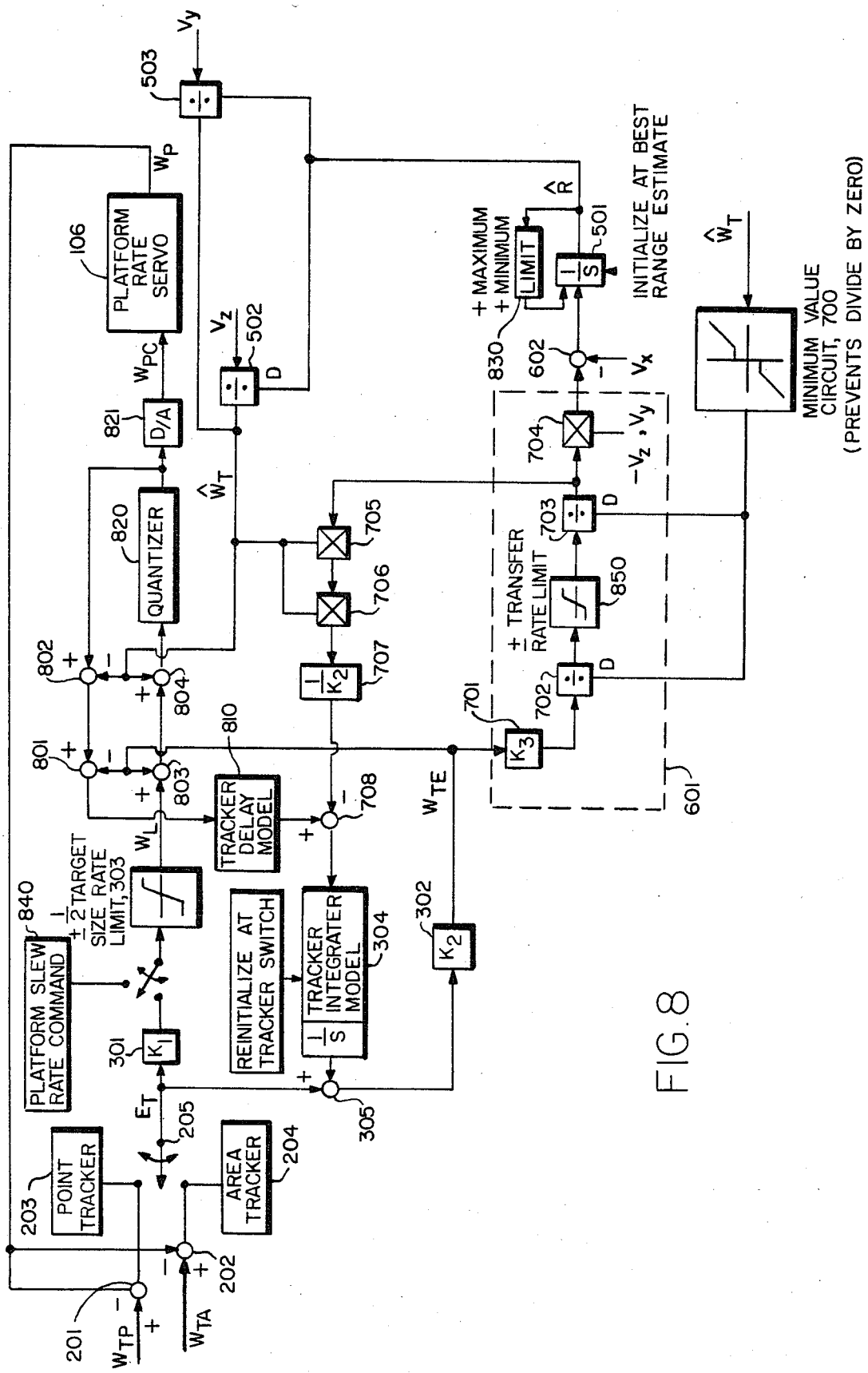
FIG. 8 is a block diagram of the preferred embodiment.

FIG. 8 is a block diagram of the preferred embodiment of the present invention. The elements of FIG. 8 correspond to like numerated elements in the previous figures. The modifications in FIG. 8 that distinguish it from the previous diagram are attempts to compensate for two significant sources of error in accurate range estimation: namely loop delays and digital to analog converter quantization incurred in commanding the analog platform rate servo loops. By studying the analysis presented here, it should become clear that accurate operation of the circuit required that the $W_{TE}$ signal is a reliable estimate of $(W_T - \dot{W}_T)$ even during mode switching. This requires that the characteristics of the path from $W_L$ through the platform rate servo and tracker back to $E_T$ must be accurately modeled in the path from $W_L$ through the tracker integrator model. The accuracy with which this can be done is limited by the many characteristics of the hardware, some predictable and some not.

The elements of FIG. 8 intended to minimize the effect of D/A quantization are: four summing junctions 801-804 the tracker delay model 810, the quantizer 820 and the digital-to-analog converter (DAC) 821.

A feedback loop is connected between the quantizer 820 and the DAC 821 and conducts the quantized rate servo command signal back to summing junction 801 and 802. At summing junction 801, the measure of the error in the rate aiding signal $W_{TE}$ from amplifier 302 is subtracted out. The resulting signal is combined with the output signal $W_L$ of the limiter 303 and conducted to summing junction 804.

Summing junction 802 subtracts out $\dot{W}_T$ the estimated value of the target line-of-sight angular velocity $W_T$ from the quantized rate servo command signal, and conducts the resulting signal to summing junction 804.

Summing junction 804 combines the signals from summing juntions 802 and 803 and conducts the resultant sum signal back through the quantizer 820 to the DAC 821. Signals $\dot{W}_T$ and $W_{TE}$ are subtracted out to compute what the limiter signal $W_L$ would have to have been to produce the quantized rate servo command signal $W_{pc}$. If the rate servo responds accurately to the quantized command, both paths in computing $W_{TE}$ see the same platform rate.

Reducing the effects of tracker delay, computational delay, and platform rate servo response time require placing a delay in the tracker model path to effectively match the combined average delay of the above error sources. This is the purpose of the tracker delay model 810.

A fairly simple hardware test can be performed to optimize adjustment for many of the error sources. If the platform is mounted on a stationary mount and the track loop is locked on to a fixed target, $W_T$ is known to be zero. Now $\dot{W}_T$ is forced to zero in software and a test signal is applied at the input labeled platform slew rate command 840. Any signal that shows up at $W_{TE}$ under these conditions represents a mismatch in the tracker model path. Gain and delay in this path can now be adjusted to minimize the error equal at $W_{TE}$. This provides a reasonable method for optimizing the performance of the rate aiding generator and corresponding range estimate.

The embodiment of the invention illustrated in FIG. 8 has the following guidelines in its design parameters: the three amplifiers 301, 302 and 701 have gains of value $K_1$, $K_2$ and $K_3$. The value of $(K_1+K_2)$ sets the track loop bandwidth. The value of $K_1$ sets the time constant for switching targets. The value of $K_2$ sets the time constant on the estimator. Finally, the value of $K_3$ sets the transfer from $W_{TE}$ to $W_T$ time constant.

Also, it should be noted that the target size limit 303 controls the platform slew rate. The transfer rate limit 850 controls the change rate of R from integrator 501 and $W_T$ from divider 502. The tracker delay model 810, discussed above, attempts to match the actual tracker loop delay.

While the invention has been described in its presently preferred embodiment it is understood that the words which have been used are words of description rather than words of limitation and that changes within the purview of the appended claims may be made without departing from the scope and spirit of the invention in its broader aspects.

What is claimed is:

1. In combination with a radar system having a servomechanism steering an antenna by physically moving said antenna with a platform angular velocity, a radar receiver receiving radar data including target line-of-sight angular velocity for area track and point track, and a rate aiding estimate producing an estimated value of said target line-of-sight angular velocity, a tracking servo compensator comprising:

a first summing means receiving said platform angular velocity from said servomechanism and said target line-of-sight angular velocity from said radar receiver, said first summing means producing an output signal by subtracting said platform angular velocity from said target line-of-sight angular velocity;

a tracker model receiving said output signal from said first summing means and producing a tracking error signal;

a track loop compensation means receiving said tracking error signal from said tracker model and producing a compensation signal compensating for said tracking error signal, said compensation signal having first and second signal components, said first signal component being proportional to said error signal, and said second signal component being proportional to the integral of said error signal;

a second summing means receiving and combining said estimated value of said target line-of-sight angular velocity from said rate aiding estimate with said compensation signal from said track loop compensation means, said second summing means providing a commanded platform angular velocity signal for said servomechanism, said commanded platform angular velocity signal causing said servomechanism to steer said antenna by physically moving said antenna with said platform angular velocity.

2. A tracking servo compensator as defined in claim 1 wherein said tracker model comprises an integrator.

3. In combination with a radar system having a servomechanism steering an antenna by physically moving said antenna with a platform angular velocity, a radar receiving radar data including target line-of-sight angular velocity for area track and point track and a rate aiding estimate producing an estimated value of each said target line-of-sight angular velocity, a tracking servo compensator comprising:

first and second summing means, each receiving said platform angular velocity from said servomechanism, said first summing means receiving said target line-of-sight angular velocity from said radar receiver for point track, subtracting said platform angular velocity and producing an output signal;

said second summing means receiving said target line-of-sight angular velocity from said radar receiver for area track, subtracting said platform angular velocity, and producing an output signal;

a point tracker model receiving said output signal from said first summing means and producing a tracking error signal for point tracking;

an area tracker model receiving said output signal from said second summing means and producing a tracking error signal for area tracking;

a switch designating a selected model by allowing selection between said point tracker model and said area tracker model and conducting said tracking error signal produced by the selected model into said tracking servo compensator;

a track loop compensator means receiving said tracking error signal from said switch and producing a compensation signal compensating for said tracking error signal, said compensation signal being proportioned to and of integral value of said error signal;

a third summing means receiving and combining said estimated value of said target line-of-sight angular velocity from said rate aiding estimate with said compensation signal from said track loop compensation means, and producing a commanded platform angular velocity signal for said servomechanism, said commanded platform angular velocity signal causing said servomechanism to steer said antenna by physically moving said antenna with said platform angular velocity.

4. A tracking servo compensator as defined in claim 3 wherein said track loop compensation means comprises:

a first amplifier receiving and amplifying said tracking error signal from said switch and producing an output signal;

a tracker integrator model receiving and integrating said output signal from said first amplifier and producing an output signal;

a fourth summing means receiving and combining said output signal from said tracker integrator model with said tracking error signal from said switch and producing an output signal;

a second amplifier receiving and amplifying said output signal from said fourth summing means and producing an error measuring signal, said error measuring signal equalling a measure of error occuring in said rate aiding signal, and a fifth summing means producing an output signal by receiving and combining said error measuring signal from said second amplifier with said output signal from said first amplifier.

5. A tracking servo compensator as defined in claim 4 wherein said track loop compensation means includes a limiter element, said limiter element receiving said output signal from said first amplifier and producing an output signal having upper and lower bounds and linearly corresponding to said output signal from said first amplifier, said limiter element sending its output signal to said tracker integrator model and to said fifth summing means in place of said output signal from said first amplifier.

6. A tracking servo compensator as defined in claim 5 including a subsystem for obtaining an accurate rate aiding signal, said subsystem receiving target velocity data from said radar receiver in the cartesian coordinates of a first, second and third velocity vector, said first velocity vector being along a tracked target's range vector, said second and third velocity vectors being perpendicular to said first velocity vector and each other, said subsystem integrating said first velocity vector to yield a range value for said tracked target, said subsystem dividing said second and third velocity vectors by said range values to obtain said accurate rate aiding signal, said subsystem sending said rate aiding signal to said third summing means.

7. A tracking servo compensator as defined in claim 6 wherein said subsystem comprises:

a third amplifier producing an output signal by receiving and amplifying said error measuring signal from said second amplifier;

a sixth summing means producing a range velocity signal by receiving and subtracting said first velocity vector received from said radar receiver from said output signal received from said third amplifier;

a second integrator producing a target range value signal by receiving and integrating said range velocity signal from said sixth summing means;

first and second dividers each receiving said range value signal from said second integrator and producing respectively first and second divider signals which combine to produce said accurate rate aiding signal, said first divider producing said first divider signal by receiving and dividing said second velocity vector from said radar receiver by said range value; and said second divider producing said second divider signal by receiving and dividing said third velocity vector by said range value.

8. A tracking servo compensator as defined in claim 7 wherein said subsystem includes: a rate transfer circuit adjusting said accurate rate aiding signal by providing adjustment to the gain of said third amplifier using said accurate rate aiding signal received from said first and second dividers and said second and third velocity vectors received from said radar receiver.

9. A tracking servo compensator as defined in claim 8 wherein said rate transfer circuit comprises:
a third and fourth divider, said third divider producing a third divider signal by receiving and dividing said output signal of said third amplifier by said accurate rate aiding signal received from said first and second dividers:
said fourth divider producing a fourth divider signal by receiving and dividing said third divider signal from said third divider by said accurate rate aiding signal received from said first and second dividers;
a first multiplier producing an output signal by receiving and multiplying said fourth divider signal from said fourth divider by said second and third velocity vectors received from said radar receiver, said first multiplier sending its output signal to said sixth summing means in place of said output signal of said third amplifier.

10. A tracking servo compensator as defined in claim 9 wherein said rate transfer circuit includes:
a minimum value circuit receiving and applying a lower bound to said accurate rate aiding signal from said first and second dividers, said minimum value circuit producing a minimum value rate aiding signal which is linearly proportional to said accurate rate aiding signal with said lower bounds applied, said minimum value circuit sending said minimum value rate aiding signal to said third and fourth dividers in place of said accurate rate aiding signal.

11. A tracking servo compensator as defined in claim 10 including a return path circuit providing stability to said tracking servo compensator by deducting an amount from said error measuring signal produced by said second amplifier, said amount equalling a value added to error measuring signal by said second amplifier and said third and fourth dividers in said rate transfer circuit.

12. A tracking servo compensator as defined in claim 11 wherein said return path circuit comprises:
a second and third multiplier, said second multiplier producing an output signal by multiplying said accurate rate aiding signal received from said first and second dividers by said fourth divider signal received from said fourth divider;
said third multiplier producing an output signal by multiplying said accurate rate aiding signal received from said second and third dividers by said output signal from said second multiplier;
a fourth amplifier producing an output signal by receiving and amplifying said output signal from said third multiplier; and a seventh summing means producing an output signal by receiving and subtracting said output signal from said fourth amplifier from said output signal from said limiter element, said seventh summing means sending its output signal to said tracker integrator model in place of said output signal from said limiter element.

13. A tracking servo compensator as defined in claim 12 including means to minimize effects of digital to analog quantization.

14. A tracking servo compensator as defined in claim 13 wherein said minimizing means comprises:
eighth and ninth summing means, said eighth summing means producing an output signal by subtracting said error measuring signal from said second amplifier from said output signal from said limiter element;
said ninth summing means producing an output signal by receiving and subtracting said accurate rate aiding signal from said first and second dividers from said output signal from said eighth summing means;
a quantizer producing a quantized rate servo command by quantizing said output signal of said ninth summing means; and
a digital to analog converter producing and sending an analog quantized rate servo command to said servomechanism by processing said quantized rate servo command received from said quantizer.

15. A tracking servo compensator as defined in claim 14 including means of reducing effects of tracker delay, computational delay and platform rate servo response time, said reducing means placing a delay in circuitry supporting said tracker integrator model.

16. A tracking servo compensator as defined in claim 15 wherein said reducing means comprises:
tenth and eleventh summing means, said tenth summing means producing an output signal by receiving and subtracting said accurate rate aiding signal produced by said first and second dividers from said quantized rate servo command produced by said quantizer;
said eleventh summing means producing an output signal by subtracting said error measuring signal produced by said second amplifier from said output signal produced by said tenth summing means; and
a tracker delay model producing an output signal by delaying said output signal from said eleventh summing means and sending its output signal to said seventh summing means in place of said output signal from said limiter element.

17. A tracking servo compensator as defined in claim 16 wherein each of said point tracker model, area tracker model and tracker integrator model comprise an integrator producing an output signal by integrating received signals.

* * * * *